US008042436B2

(12) United States Patent  
Muraki et al.

(10) Patent No.: US 8,042,436 B2  
(45) Date of Patent: Oct. 25, 2011

(54) METHOD FOR PREPARING NC MACHINING PROGRAM AND APPARATUS FOR PREPARING NC MACHINING PROGRAM (75) Inventors: Toshiyuki Muraki, Niwa gun (JP); Hiromasa Yamamoto, Niwa gun (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 496 days.

(21) Appl. No.: 11/565,690

(22) Filed: Dec. 1, 2006

(65) Prior Publication Data

US 2007/0144316 A1 Jun. 28, 2007

(30) Foreign Application Priority Data

Dec. 2, 2005 (JP) .................................. 2005-349730

(51) Int. Cl.  
B23B 3/30 (2006.01)

(52) U.S. Cl. .......................................... 82/118; 82/1.11

(58) Field of Classification Search ............ 82/1.11, 82/118, 121; 700/176, 194, 72  
See application file for complete search history.

(56) References Cited

U.S. PATENT DOCUMENTS

| 2,281,353 | A | * | 4/1942 | Hubbard ....................... 409/211 |
| 3,633,011 | A | * | 1/1972 | Bederman et al. ............ 700/192 |
| 4,135,239 | A | * | 1/1979 | Hamill et al. ................. 700/180 |
| 4,375,763 | A | * | 3/1983 | Machida et al. .............. 451/163 |
| 4,413,539 | A | * | 11/1983 | Ishizuka et al. ................. 82/120 |
| 4,502,125 | A | * | 2/1985 | Yoneda et al. ................ 700/194 |
| 4,529,342 | A | * | 7/1985 | Babel ............................ 409/164 |
| 4,564,914 | A | * | 1/1986 | Ballough et al. ............. 700/163 |
| 4,979,121 | A | * | 12/1990 | Inoue et al. ................... 700/194 |
| 5,058,029 | A | * | 10/1991 | Uemura ......................... 700/176 |
| 5,214,829 | A | * | 6/1993 | Minagawa ..................... 29/27 C |
| 5,315,789 | A | * | 5/1994 | Takashi ............................. 451/5 |
| 5,773,950 | A | * | 6/1998 | Yamamoto ................ 318/568.19 |
| 5,919,380 | A | * | 7/1999 | Magara et al. ............. 219/69.16 |
| 6,536,317 | B2 | * | 3/2003 | Yamazaki et al. ............. 82/118 |
| 6,715,386 | B2 | * | 4/2004 | Maier ............................. 82/1.11 |
| 6,796,012 | B2 | * | 9/2004 | Geissler et al. ................ 29/27 C |
| 6,819,973 | B2 | * | 11/2004 | Nakahira et al. ............. 700/193 |
| 6,836,941 | B2 | * | 1/2005 | Prust et al. .................... 29/27 C |
| 6,842,664 | B2 | * | 1/2005 | Harada et al. ................. 700/186 |
| 6,909,939 | B1 | * | 6/2005 | Yamada ......................... 700/189 |
| 6,999,845 | B2 | * | 2/2006 | Hirai et al. .................... 700/189 |
| 7,283,889 | B2 | * | 10/2007 | Otsuki et al. ................. 700/186 |
| 2003/0177623 | A1 | * | 9/2003 | Geissler et al. ............... 29/27 C |
| 2005/0117985 | A1 | | 6/2005 | Zhang et al. |

FOREIGN PATENT DOCUMENTS

| EP | 1158378 A2 | 11/2001 |
| EP | 1168125 A2 | 1/2002 |
| JP | 62054604 | 3/1987 |
| JP | 10-118803 | 12/1998 |
| JP | 2002103139 A | * 4/2002 |

* cited by examiner

Primary Examiner — Boyer D Ashley  
Assistant Examiner — Jennifer Swinney  
(74) Attorney, Agent, or Firm — Fox Rothschild LLP (57) ABSTRACT A preparing apparatus of an NC machining program prepares an NC machining program including a position instruction of a cutting portion of a rotary tool on the basis of a two-dimensional workpiece coordinate system having a Z-axis and an X-axis as coordinate axes. An operator inputs a lead clearance α and a radial clearance β to the preparing apparatus via an input operation section. A processing section converts the NC machining program prepared on the basis of the two-dimensional workpiece coordinate system into an NC machining program including a position instruction of a three-dimensional workpiece coordinate system having the X-axis, a Y-axis and the Z-axis as the coordinate axes, on the basis of the lead clearance α and the radial clearance β.

3 Claims, 6 Drawing Sheets

<Machining Program before Conversion>

```
X X1  Z Z1;
X X2;
   Z Z2;
X X3  Z Z3;
...
```

$X = (-L) * (1 - \cos\alpha) + Xn * \sin\beta$
$Y = Xn * \cos\beta$
$Z = Zn + L * \sin\alpha - R * \cos\alpha$

Fig. 3B

<Machining Program after Conversion>

```
M203 S1500;
Instruction for
rotating milling tool
G00 B α;
Instruction for
turning about B-axis
X __ Y __ Z __;
X __ Y __ Z __;
X __ Y __ Z __;
X __ Y __ Z __;
...
```

Setting of Lead Clearance
(Setting of B-axis angle)

Fig.5

Setting of Radial Clearance

X-Y plane

METHOD FOR PREPARING NC MACHINING PROGRAM AND APPARATUS FOR PREPARING NC MACHINING PROGRAM

BACKGROUND OF THE INVENTION

The present invention relates to a method for preparing an NC machining program and an apparatus for preparing an NC machining program.

Conventionally, there has been known an NC machining apparatus for executing a cutting process of a workpiece made of a difficult-to-machine material such as a heat-resistant alloy or the like. As the NC machining apparatus, for example, a description will be given of a case that a workpiece made of the heat resistant alloy is processed by using an NC lathe. At a time of describing the process of the workpiece, X-axis, Z-axis and Z-axis directions are defined respectively as shown in FIGS. 6 to 8.

Figure 6:
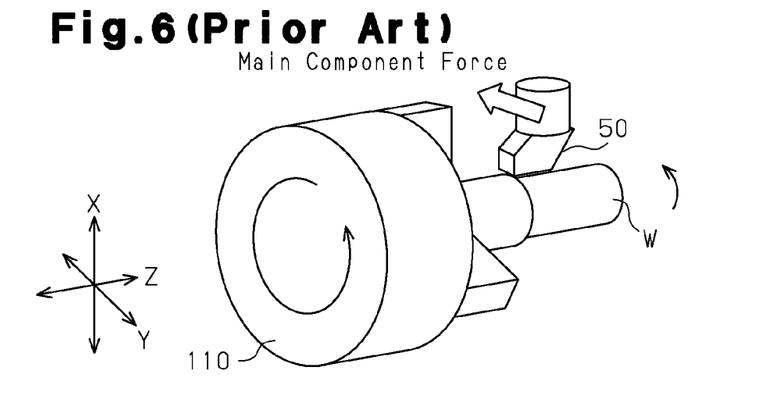
FIG. 6 is an explanatory view showing a method of cutting a workpiece by using a bite

As shown in FIG. 6, in the case of cutting a workpiece W by using a normal bite 50, since thermal conductivity of the bite 50 is low, heat is not transmitted to the workpiece W from the bite 50, and the heat tends to be accumulated in the bite 50. Accordingly, the structure is made such as to make a rotating speed of the workpiece W lower so as to cut the workpiece W (hereinafter, refer to as a prior art 1).

In accordance with the prior art 1, a cut portion of the bite 50 tends to be exposed to a boundary damage as the bite 50 generates heat. Accordingly, a machining efficiency is low, and a service life of the bite 50 is short. Further, since a part of a rotating force is applied to the bite 50 at a time when the workpiece W is rotated, the bite 50 is bent and the cutting process is not stable.

Figure 7:
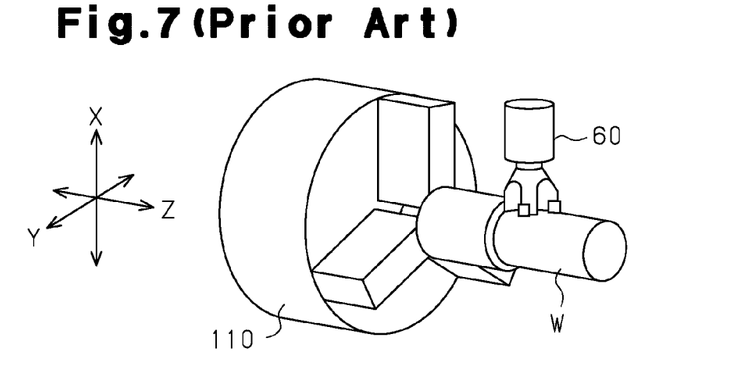
FIG. 7 is an explanatory view showing a method of cutting the workpiece by using an end mill.
Figure 8A:
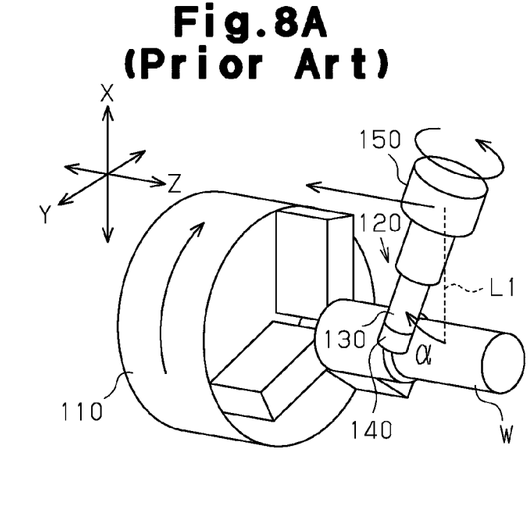
FIG. 8A is an explanatory view showing a method of cutting the workpiece by using a circular tip.
Figure 8B:
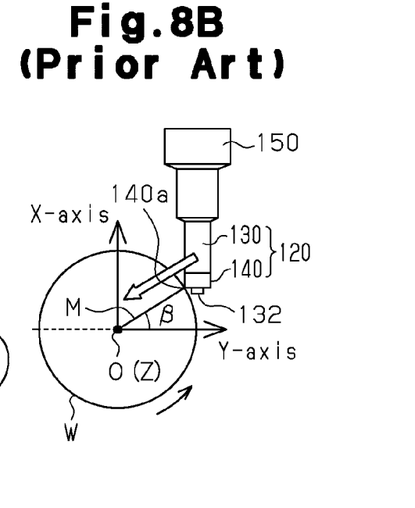
FIG. 8B is an explanatory view showing the method of cutting the workpiece by using the circular tip.

Further, as shown in FIG. 7, there is a method of cutting the workpiece W by using an end mill 60 (hereinafter, refer to as a prior art 2). In accordance with the prior art 2, it is possible to suppress the heat generated at a time of cutting. However, a profile irregularity of the processed surface of the workpiece W is low, and a machining efficiency is low.

Further, in Japanese Laid-Open Patent Publication No. 10-118803, there is proposed a method of cutting a workpiece W by using a rotary bite. In this case, since a tip of the rotary bite is exposed to a cutting load, the position of the rotary bite is continuously changed. Accordingly, a rotating speed of the rotary bite is determined in correspondence to the cutting load (hereinafter, refer to as a prior art 3). In accordance with the prior art 3, a generation of the boundary damage is suppressed. However, since the rotating speed of the rotary bite is determined in correspondence to the cutting load, it is impossible to obtain a high machining efficiency.

In recent years, as shown in FIGS. 8A and 8B, there has been proposed a technique of fixing a circular tip 140 to a distal end of a rotary tool 120, and cutting a workpiece W by the circular tip 140. In this case, a tool holding portion 150 is provided in a bite holder (not shown), and the rotary tool 120 is attached to the tool holding portion 150. The bite holder can turn around a B-axis which is in parallel to the Y-axis, and can reciprocate in the X-axis, Y-axis and Z-axis directions. The rotary tool 120 is constituted by a tool main body 130 and a circular tip 140. The tool main body 130 is attached to the tool holding portion 150, and the tip 140 is fastened at a center in a distal end of the tool main body 130 by a bolt 132.

(Lead Clearance α)

As shown in FIG. 8A, the circular tip 140 is inclined in the direction of the Z-axis from a standard position shown by straight line L1, specifically, a feeding direction of the circular tip 140. The lead clearance α can be expressed as an angle formed by the straight line L1 and an axis of the circular tip 140.

Figure 10:
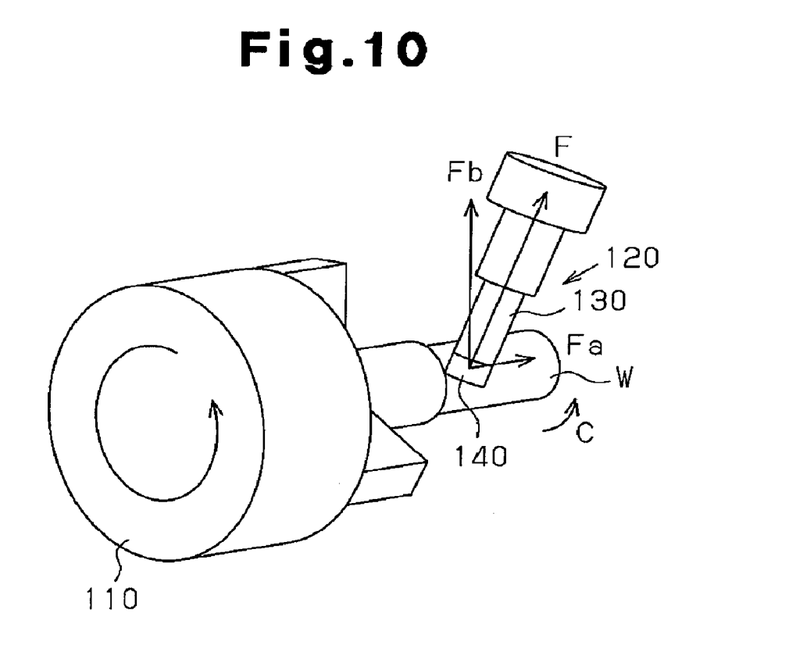
FIG. 10 is an explanatory view showing the method of cutting the workpiece by using the circular tip.

A description will be given of a reason for setting the lead clearance α with reference to FIG. 10. In FIG. 10, reference symbol C denotes a rotating direction of the workpiece W. In the case that the lead clearance α is 0 degree, the rotary tool 120 tends to be bent at a time of cutting the workpiece W. Accordingly, the cutting of the workpiece becomes unstable, and a profile irregularity of the processed surface is lowered.

Accordingly, when the circular tip 140 is moved in the direction of the Z-axis at a time of cutting the workpiece W, the circular tip 140 is inclined at the lead clearance α (refer to FIG. 8). In this case, an auxiliary component force Fb is applied to the circular tip 140 in the feeding direction of the circular tip 140, and a main component force Fb is applied thereto in a direction orthogonal to the feeding direction. Further, the rotary tool 120 is hard to be bent by applying a combined force F of the respective component forces Fa and Fb in the same direction as the axis of the circular tip 140. Accordingly, a vibration of the rotary tool 120 is suppressed, a service life of the tool becomes longer, and the profile irregularity of the processed surface is improved.

Further, in the case of cutting the workpiece W having a large diameter by setting the lead clearance α to 0 degree, it is necessary to enlarge a protruding amount of the tool from the bite holder so as to avoid interference between the tool and the bite holder. However, in this case, the rigidity of the tool is lowered. Accordingly, if the lead clearance α is set to an angle other than 0 degrees, it is possible to make the protruding amount of the tool small, and it is possible to make the rigidity of the tool higher.

(Radial Clearance β)

As shown in FIG. 8B, the circular tip 140 is arranged in an upper side of center line O of the workpiece W. The radial clearance β is expressed as an angle (a cutting angle) formed by a cutting surface M including center line O of the workpiece W and a cutting portion 140a of the circular tip 140 and the Y-axis. Stated another way, and also as shown in FIG. 8B, the cutting surface M can represent a line M from the center line O of the workpiece W to a point of contact of the rotating tool 120 against the workpiece W during the cutting operation. The radial clearance β is the angle between the line M and the Y-axis.

Figure 9:
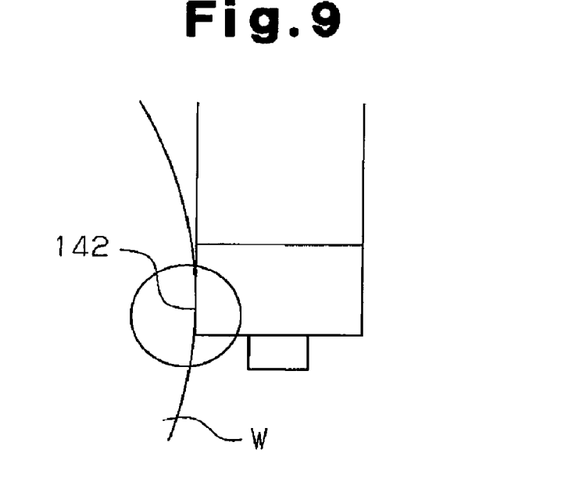
FIG. 9 is an explanatory view showing the method of cutting the workpiece by using the circular tip.

A description will be given of a reason for setting the radial clearance β with reference to FIG. 9. In the case that the radial clearance β is 0 degrees, a flank 142 of the circular tip 140 is undesirably brought into contact with the workpiece W so as to wear.

Accordingly, a clearance is secured between the flank 142 of the circular tip 140 and the workpiece W by setting the radial clearance β at a time of cutting the workpiece W. Therefore, an abrasion loss of the flank 142 of the circular tip 140 is reduced, and a service life of the tool is elongated.

Further, the abrasion loss of the flank is reduced even in a negative tip, in which a relief angle of a cutting edge is 0 degrees, by changing the radial clearance β so as to adjust an amount of the clearance between the circular tip 140 and the workpiece W. Further, in the case that a movable distance in the direction of the Y-axis of the circular tip 140 is small, at a time of cutting a workpiece W having a large diameter, it is preferable to enlarge the radial clearance β.

As mentioned above, the abrasion loss of the circular tip 140 is reduced by adjusting the lead clearance α and the radial clearance β so as to cut a workpiece W, and the profile irregularity of the processed surface is improved.

In accordance with the prior arts 1 to 3, the NC machining program is prepared in such a manner that the rotary tool moves in the direction of the X-axis and the direction of the Z-axis. In this case, since a coordinate position of the rotary tool is expressed only by an X-Z two-dimensional coordinate, it is possible to easily prepare the NC machining program.

However, as shown in FIGS. 8A and 8B, in the case that a workpiece W is cut by using the circular tip 140, it is necessary that the coordinate position of the tool is expressed by an X-Y-Z three-dimensional coordinate. In this case, a structure of the program becomes complicated, and it is impossible to easily prepare the NC machining program.

SUMMARY OF THE INVENTION

An object of the present invention is to provide a method which can easily prepare an NC machining program used in a case of cutting by using a rotary tool, and a preparing apparatus of the NC machining program.

In accordance with one aspect of the present invention, a method for preparing an NC machining program used in an NC machining apparatus is provided. The NC machining apparatus includes a workpiece main shaft and a bite holder. A workpiece is attached to the workpiece main shaft. The bite holder is provided so as to be movable along a second axis which is orthogonal to a first axis corresponding to an axis of the workpiece main shaft. The workpiece main shaft or the bite holder is provided so as to be rotatable around a turning axis which is in parallel to a third axis orthogonal to the first axis and the second axis. A peripheral surface of the workpiece attached to the workpiece main shaft is cut by a rotary tool provided in the bite holder while the workpiece main shaft is rotated around the first axis. The method includes: a first step of preparing an NC machining program including a position instruction of a cutting portion of the rotary tool at a time of cutting, on the basis of a two-dimensional workpiece coordinate system having the first axis and the second axis as coordinate axes; a second step of inputting a first angle around the turning shaft, and a second angle formed by a cutting surface including the first axis and the cutting portion and the third axis to the NC machining apparatus, with respect to the workpiece main shaft or the bite holder at a time of cutting; and a third step of converting the NC machining program prepared in the first step into an NC machining program including a position instruction of a three-dimensional workpiece coordinate system having the first axis, the second axis and the third axis as the coordinate axes, on the basis of the first angle and the second angle.

In accordance with a second aspect of the present invention, an apparatus for preparing an NC machining program for an NC machining apparatus is provided. The NC machining apparatus includes a workpiece main shaft and a bite holder. A workpiece is attached to the workpiece main shaft to which a workpiece is attached. The bite holder is provided so as to be movable along a second axis which is orthogonal to a first axis corresponding to an axis of the workpiece main shaft. The workpiece main shaft or the bite holder is provided so as to be rotatable around a turning axis which is in parallel to a third axis orthogonal to the first axis and the second axis. A peripheral surface of the workpiece attached to the workpiece main shaft is cut by a rotary tool provided in the bite holder, while rotating the workpiece main shaft around the first axis. The apparatus further includes preparing means, inputting means, and converting means. The preparing means prepares an NC machining program including a position instruction of a cutting portion of the rotary tool at a time of cutting, on the basis of a two-dimensional workpiece coordinate system having the first axis and the second axis as coordinate axes. The inputting means inputs a first angle around the turning shaft, and a second angle formed by a cutting surface including the first axis and the cutting portion and the third axis to the NC machining apparatus, with respect to the workpiece main shaft or the bite holder at a time of cutting. The converting means converts the NC machining program prepared in the preparing means into an NC machining program including a position instruction of a three-dimensional workpiece coordinate system having the first axis, the second axis and the third axis as the coordinate axes, on the basis of the first angle and the second angle.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A description will be given of an embodiment obtained by embodying the present invention in a preparing apparatus of an NC machining program for an NC machining apparatus, with reference to FIGS. 1 to 5.

Figures 1A, 1B:
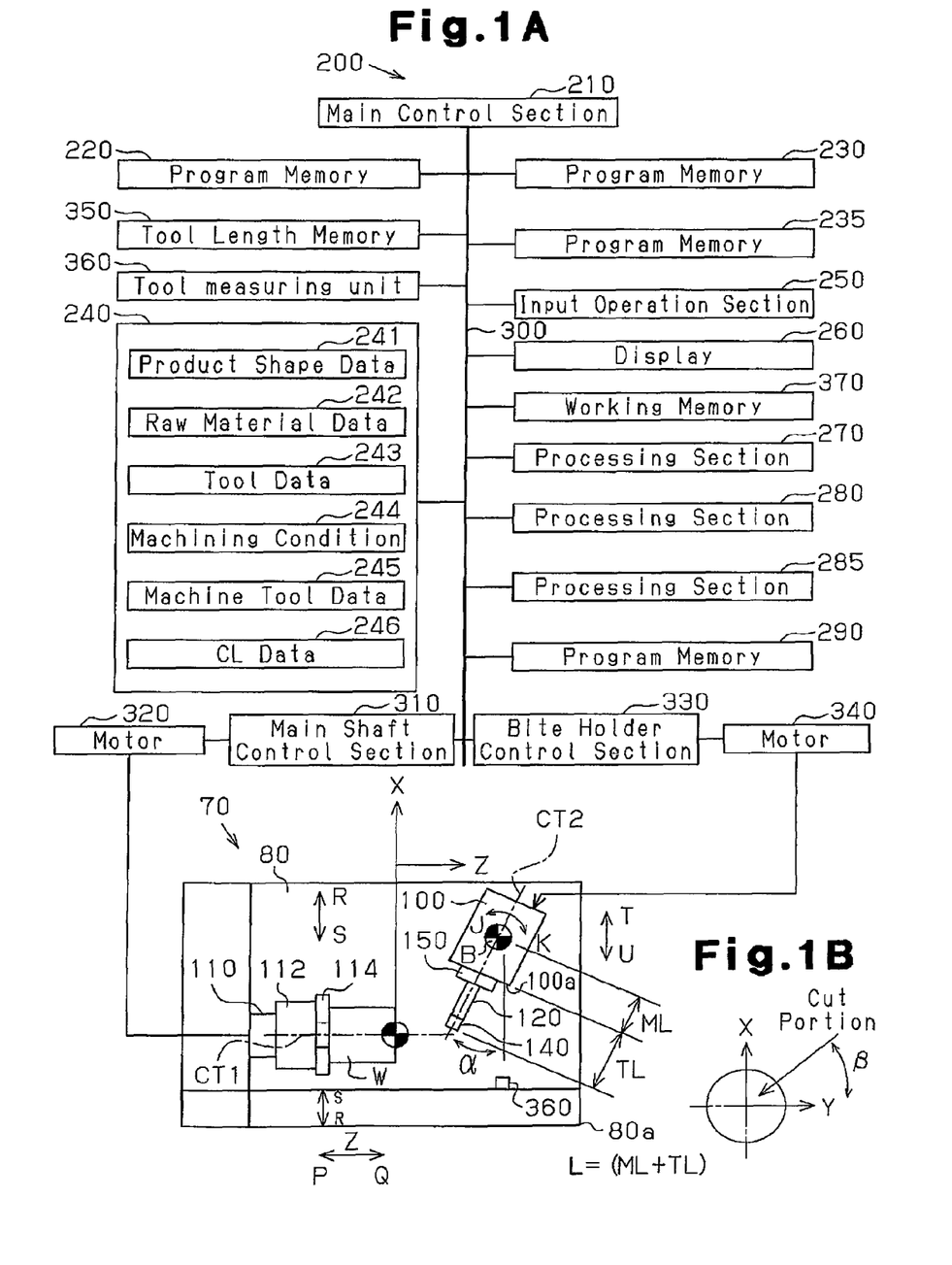
FIG. 1 is a block diagram showing a preparing apparatus of an NC machining program in accordance with the present embodiment.

As shown in FIG. 1, a preparing apparatus 200 is provided with a main control section 210 constituted by a CPU. To the main control section 210, there are connected various memories 220, 230, 235, 290 and 350, storage means 240, an input operation section 250, a display 260, processing sections 270 and 280, various control sections 310 and 330, a tool measuring unit 360 and the like via a bus line 300. Further, a working memory 370 constituted by a RAM is connected to the main control section 210 via the bus line 300.

Each of the program memories 220, 230 and 235 is constituted by a ROM. A system program for executing various controls of the preparing apparatus 200 is stored in the program memory 220. A program for preparing the NC machining program is stored in the program memory 230. A program for preparing a new NC machining program by converting the NC machining program stored in the memory 290 is stored in the program memory 235. The tool length memory 350 is constituted by the RAM, and is provided for storing a tool length TL.

The storage means 240 is constituted by a storage device writing data in a hard disc and reading the data from the hard disc. The storage means 240 has various storage sections 241, 242, 243, 244, 245 and 246. Shape data of a product is stored in the storage section 241. Raw material data of the workpiece W is stored in the storage section 242. Tool data is stored in the storage section 243. A machining condition of the workpiece W is stored in the storage section 244. Data of a machine tool is stored in the storage section 245. Cutter location (CL) data is stored in the storage section 246. The CL data includes the data of at least a moving position of a tool, a feeding speed of the tool, a rotating speed of the tool, and the like.

A shape data of the product input from a CAD apparatus (not shown) and the input operation section 250 is stored in the storage section 241. The shape data is expressed by a set of three-dimensional coordinate values. Further, the raw material data input from the CAD apparatus and the input operation section 250 is stored in the storage section 242. The raw material data corresponds to data relating to a shape, a material and the like of the raw material.

The tool data stored in the storage section 243 corresponds to data relating to a kind of the tool such as a circular tip, a drill, an end mill, a face mill and the like serving as a rotary tool, a nominal dimension of the tool, a material of the tool and the like. In the present embodiment, data indicating a radius R of the circular tip 140 having a columnar shape is stored in the storage section 243.

The machining data of the machine tool stored in the storage section 244 corresponds to data relating to a feeding amount of the tool (for example, a feeding amount of the tool at a time of turning the circular tip 140 at one time), a cutting speed and the like. The machining data is set per tool in correspondence to a kind of the machining such as a rough machining, a finish machining and the like, a material of the raw material or a material of the tool.

The data stored in the storage section 245 corresponds to data relating to a kind of the machine tool, for example, a machining center, a lathe or the like, a structure of the machine tool and the like. In the storage section 245, there is stored at least a length ML from a B-axis serving as a turning shaft corresponding to a center of rotation of a bite holder 100 to a mounting surface 100a of the bite holder 100 to which the rotary tool 120 is attached.

The CL data generated by a processing section 270 is stored in the storage section 246. The input operation section 250 is constituted by a keyboard and a mouse. The display 260 is constituted by a liquid crystal display. The processing section 270 generates the CL data on the basis of the data stored in the various storage sections 241, 242, 243 and 244.

The processing section 280 converts the CL data stored in the storage section 246 into an NC machining program in accordance with the program stored in the program memory 230. Specifically, the processing section 280 converts the CL data into an absolute coordinate system from a workpiece coordinate system on the basis of the data stored in the storage section 245 so as to prepare the NC machining program. The absolute coordinate system means a specific coordinate system set with respect to the machine tool, and the workpiece coordinate system means a coordinate system set with respect to the workpiece (the raw material) fixed to the machine tool.

The NC machining program is stored in the program memory 290 constituted by the RAM after being prepared by the processing section 280. A processing section 285 converts the NC machining program stored in the memory 290 into a new NC machining program in accordance with the program stored in the memory 235, and stores it in a program memory 290.

Next, a description will be given of an NC lathe 70 connected to the preparing apparatus 200. In the NC lathe 70, the same reference numerals are attached to the same parts as those of the NC lathe in accordance with the prior art.

The NC lathe 70 is provided with a frame 80, the bite holder 100 and a workpiece main shaft 110. The workpiece main shaft 110 is provided with a chuck 112 having a pawl 114. The workpiece W is held by the chuck 112 or is disconnected from the chuck 112 by moving the pawl 114 in a direction of arrow S or a direction of arrow R.

A motor 320 for rotationally driving the workpiece main shaft 110 is connected to a main shaft control section 310. The workpiece main shaft 110 can rotate around an axis CT1 extending in the same direction as the Z-axis. When the motor 320 is driven on the basis of a control signal from the main shaft control section 310, the workpiece main shaft 110 is rotated around the axis CT1.

A motor 340 for driving the bite holder is connected to a bite holder control section 330. The bite holder 100 can be moved in a direction of the Z-axis and a direction of the X-axis which is orthogonal to the Z-axis (a direction of arrow T and a direction of arrow U). Further, the bite holder 100 can be moved in a direction of the Y-axis, and can be rotated around the Y-axis in a direction of arrow J and a direction of arrow K.

A tool holding portion 150 is provided in the bite holder 100. The rotary tool 120 is installed to the tool holding portion 150. A distal end of the rotary tool 120 has the same structure as the structure shown in FIG. 8B. The axis CT1 of the workpiece main shaft 110 coincides with center line O of the workpiece W.

A tool measuring unit 360 is arranged on a base 80a of a frame 80 positioned below the bite holder 100. A tool length TL of the rotary tool 120 attached to the bite holder 100 is measured by the tool measuring unit 360. In the present embodiment, the Z-axis corresponds to a first axis, the X-axis corresponds to a second axis, and the Y-axis corresponds to a third axis.

Next, a description will be given of a preparing method of the NC machining program for cutting the workpiece W by using the circular tip 140 with reference to FIGS. 2A and 2B. In this case, the shape data of the product is stored in the storage section 241, and the data indicating "column" is stored as the shape data of the raw material, in the storage section 242. Further, the data indicating "heat resistant alloy" is stored as the material data of the raw material in the storage section 242.

Figure 2A:
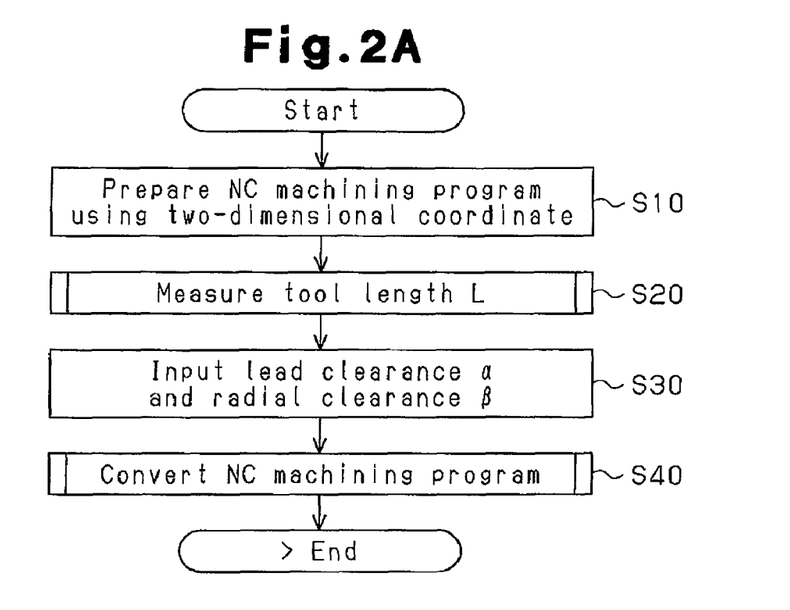
FIG. 2A is a flow chart showing a preparing procedure of the NC machining program.

As shown in FIG. 2A, in step S10, the processing section 270 determines an order for machining an extracted position after extracting a shape of the processed position on the basis of the shape data stored in the storage sections 241 and 242 in accordance with a predetermined program.

Next, the processing section 270 determines a tool to be used in each of the processed position by referring to the tool data stored in the storage section 243, on the basis of the shape of the processed position and the material data of the raw material stored in the storage section 242. In the present embodiment, in the case that the heat resistant alloy is extracted as the raw material data, the circular tip is selected as the tool to be used.

Next, the processing section 270 sets the machining condition suitable for the rotary tool 120 by referring to the data stored in the storage section 244. Further, the processing section 270 generates the data relating to the rotating speed and the feeding speed of the rotary tool 120 on the basis of the set machining condition. Further, the processing section 270 generates the moving position data of the tool in the workpiece coordinate system as the CL data. The moving position indicates the position of the two-dimensional coordinate system including the X-axis and the Z-axis as the coordinate axes. The CL data generated as mentioned above is stored in the storage section 246.

As mentioned above, in step S10, the CL data is generated by the processing section 270 on the basis of the various data stored in the storage sections 241 to 244. Further, the NC machining program is prepared by the processing section 280 on the basis of the CL data (refer to FIG. 3A). The NC machining program prepared as mentioned above is stored in the program memory 290 by the main control section 210. The NC machining program prepared in step S10 is the same as the NC machining program at a time of cutting a workpiece by using the normal bite 50.

Figure 3A:
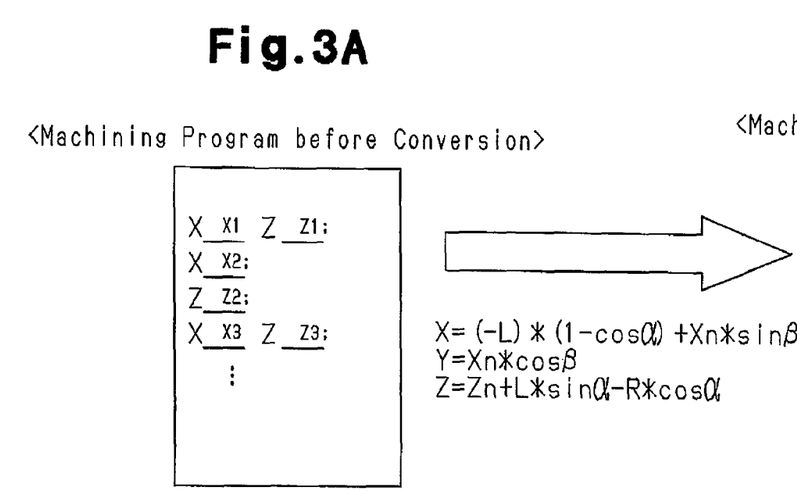
FIG. 3A is an explanatory view showing the NC machining program before being converted.

The position instruction "X x1 Z z1;" shown in FIG. 3A is an instruction for moving the bite holder 100 to a position at x1 in the X coordinate value, and at z1 in the Z coordinate value. In accordance with the position instruction, the cutting edge of the tool is arranged at a point P1 (x1, z1) shown in FIG. 3C.

The next position instruction "X x2 ;" is an instruction for moving the bite holder 100 a position at x2 in the X coordinate value without moving the bite holder 100 in the Z-axis direction. In accordance with the position instruction, the cutting edge of the tool is arranged at a point P2 (x2, z1) shown in FIG. 3C. The next position instruction "Z z2;" is an instruction for, without moving the bite holder 100 in the X-axis direction, moving the bite holder 100 to a position at z2 in the Z coordinate value. In accordance with the position instruction, the cutting edge of the tool is arranged at a point P3 (x2, z2) shown in FIG. 3C.

Further, the next position instruction "X x3 Z z3;" is an instruction for moving the bite holder 100 to a position at x3 in the X coordinate value, and a point at z3 in the Z coordinate value. In accordance with the position instruction, the cutting edge of the tool is arranged at a point P4 (x3, z3) shown in FIG. 3C. Step S10 corresponds to a first step.

In step S20, the working mode is set to the tool length measuring mode, on the basis of an operation of the input operation section 250 by an operator. If the mode is set to the tool length measuring mode, the tool measuring unit 360 is controlled by the main shaft control section 310, and the tool length TL of the rotary tool 120 attached to the bite holder 100 is measured. At a time of measuring the tool length TL, the rotary tool 120 is arranged in parallel to the X-axis in a state in which the distal end thereof is directed to the lower side. In this state, the tool measuring unit 360 is extended to the upper side, and an upper surface of the tool measuring unit 360 is brought into contact with the distal end of the circular tip 140, whereby the tool length TL of the rotary tool 120 is measured. The tool length TL indicates a protruding amount of the rotary tool 120 from the bite holder 100. In other words, it corresponds to a distance from the distal end of the circular tip 140 shown in FIG. 1 to the mounting surface 100a of the bite holder 100 to which the rotary tool 120 is attached. The tool length TL is stored in the tool length memory 350 by the main shaft control section 310.

In step S30, the lead clearance $\alpha$ ($0 < \alpha < 90$ degrees) and the radial clearance $\beta$ ($0 < \beta < 90$ degrees) are input to the preparing apparatus 200 on the basis of the operation of the input operation section 250 by the operator. The data is stored in the working memory 370 by the main control section 210. Step S30 corresponds to a second step.

In step S40, if the operator operates a program conversion key (not shown) provided in the input operation section 250, the processing section 285 executes an NC machining program conversion process shown below in accordance with a predetermined program. Step S40 corresponds to a third step.

Figure 2B:
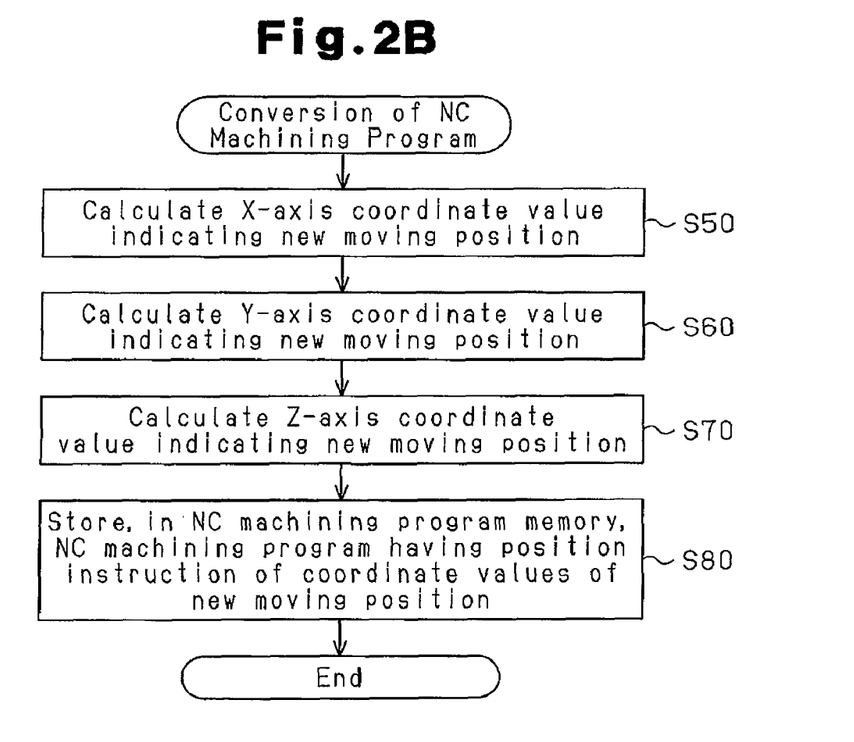
FIG. 2B is a flow chart showing the preparing procedure of the NC machining program.

As shown in FIG. 2B, in step S50, the processing section 285 calculates the X-axis coordinate value indicating a new moving position (a position instruction) of the circular tip. In this case, the new moving position indicates a position of the circular tip 140 newly set on the basis of the lead clearance $\alpha$ and the radial clearance $\beta$.

Figure 4:
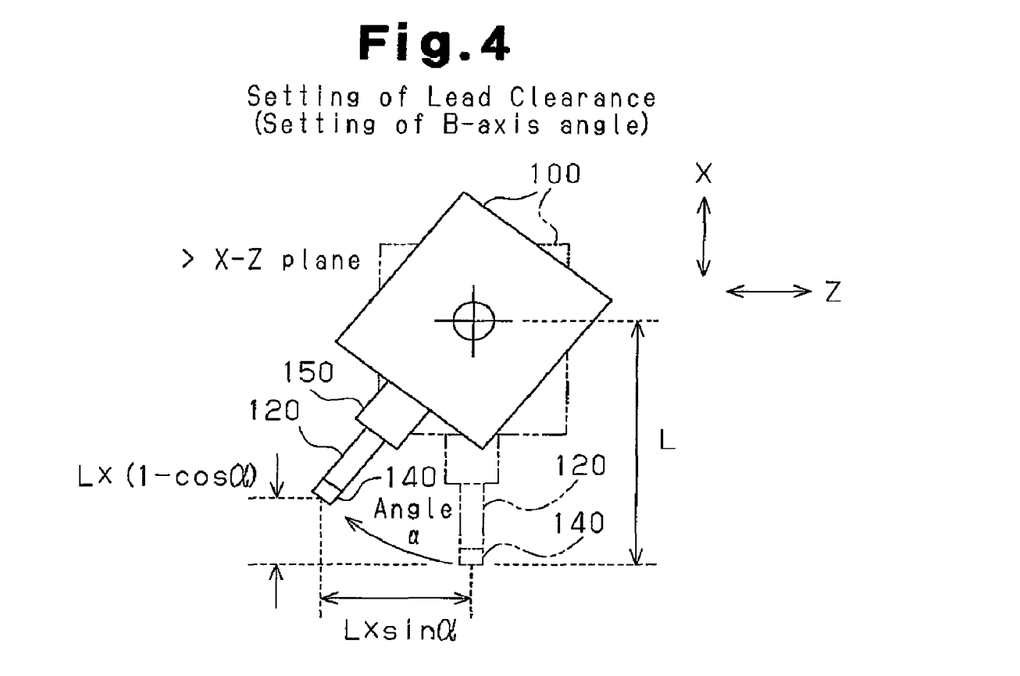
FIG. 4 is an explanatory view showing an angle around a B-axis.

As shown in FIG. 4, since the bite holder 100 turns around the B-axis in correspondence to the set value of the lead clearance $\alpha$, the cutting portion of the circular tip 140 is moved by a distance "L×(1−cos $\alpha$)" along the X-axis from a position shown by a two-dot chain line. In this case, reference symbol L denotes a fixed value, and satisfies a relationship L=ML+TL. The reference symbol L indicates a distance from the B-axis to the distal end of the rotary tool 120. Reference symbol $\alpha$ corresponds to a first angle.

Figure 5:
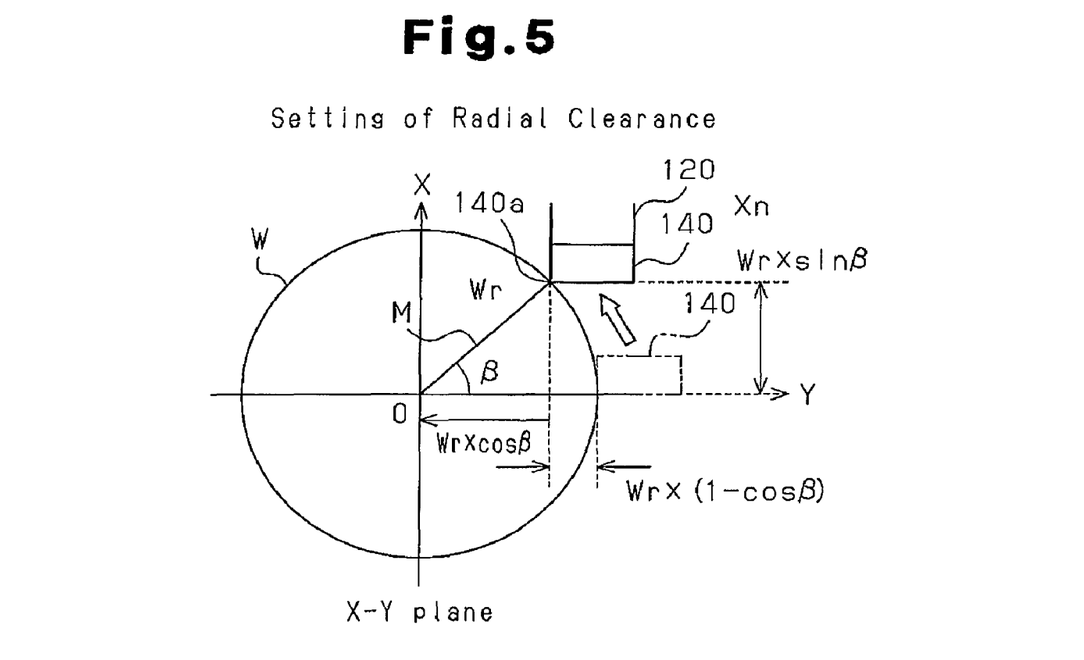
FIG. 5 is an explanatory view showing a radial clearance.

Further, as shown in FIG. 5, the cutting portion of the circular tip 140 is moved by a distance "Wr×sin $\beta$" along the X-axis from a position shown by a two-dot chain line, in correspondence to the set value of the radial clearance $\beta$. Reference symbol $\beta$ corresponds to a second angle. Reference symbol Wr indicates a distance between a cutting portion 140a of the circular tip 140 at a time of cutting, and the center line O of the workpiece W. Reference symbol Wr is equal to an X-axis coordinate value Xn of the circular tip 140 on the basis of the position instruction. Reference symbol Wr is changed each time when the X-axis coordinate value of the circular tip 140 is changed, in accordance that the circular tip 140 wears due to the cutting of the workpiece W.

Accordingly, in step S50, the processing section 285 calculates the X-axis coordinate value indicating the new moving position, on the basis of the X-axis coordinate value xn (n=1,2,3, . . . ) of the two-dimensional workpiece coordinate system by using the following expression (1). Reference symbol n indicates an order by which the position instruction is output with respect to the X-axis coordinate value. Further, "×" expresses a multiplication.

$$X = (-L) \times (1 - \cos \alpha) + xn \times \sin \beta \qquad (1)$$

In this case, "L×(1−cos $\alpha$)" is an offset amount of the X-axis coordinate in the two-dimensional workpiece coordinate system set in correspondence to the lead clearance $\alpha$. Further, "xn×sin $\beta$" is an offset amount of the X-axis coordinate in the two-dimensional workpiece coordinate system set in correspondence to the radial clearance $\beta$.

In accordance with the expression (1) mentioned above, the X-axis coordinate value of a new three-dimensional workpiece coordinate system is calculated in such a manner as to correspond to the X-axis coordinate value xn in the two-dimensional workpiece coordinate system before being changed. In this case, the calculated value is stored in the working memory 370.

In step S60, the processing section 285 calculates the Y-axis coordinate value indicating the new moving position.

As shown in FIG. 5, the cutting position of the circular tip 140 is moved by a distance "Wr×(1−cos β)" along the Y-axis from a position shown by a two-dot chain line, in correspondence to the set value of the radial clearance β. Specifically, the processing section 285 calculates the Y-axis coordinate value of the new moving position by using the following expression (2).

$$Y = xn \times \cos \beta \quad (2)$$

"Wr×(1−cosβ)" shown in FIG. 5 corresponds to an offset amount of the Y-axis coordinate in the two-dimension workpiece coordinate system set in correspondence to the radial clearance β. In accordance with the expression (2) mentioned above, the Y-axis coordinate value of the three-dimensional workpiece coordinate system is calculated. Further, the calculated Y-axis coordinate value is correlated with the X-axis coordinate value of the three-dimensional workpiece coordinate system calculated in step S50, and is stored in the working memory 370.

In step S70, the processing section 285 calculates the Z-axis coordinate value indicating the new moving position. As mentioned above, since the bite holder 100 turns around the B-axis by setting the lead clearance α, the cutting position of the circular tip 140 in the Z-axis coordinate is changed at the distances "L×sin α" and "R×cos α" in the Z-axis direction. In other words, the processing section 285 calculates the Z-axis coordinate value indicating the new moving position by using the following expression (3). Reference symbol n (n=1,2,3, . . . ) denotes an order by which the position instruction is output with respect to the Z-axis coordinate value.

$$Z = zn + L \times \sin \alpha - R \times \cos \alpha \quad (3)$$

"L×sin α" corresponds to an offset amount of the Z-axis coordinate in the two-dimensional workpiece coordinate system set in correspondence to the lead clearance α. "R×cos α" corresponds to a correction amount on the basis of a change of an effective diameter of the circular tip 140.

In accordance with the expression (3) mentioned above, the Z-axis coordinate value of the three-dimensional workpiece coordinate system is calculated. Further, the calculated Z-axis coordinate value is correlated with the X-axis coordinate value and the Y-axis coordinate value in the three-dimensional workpiece coordinate system calculated in steps S50 and S60 so as to be stored in the working memory 370.

In step S80, the processing section 285 stores the coordinate value relating to each of the shafts calculated in steps S50 to S70 as the position instruction of the three-dimensional workpiece coordinate system in the NC machining program memory 290 and thereafter finishes the present process.

Figure 3B:
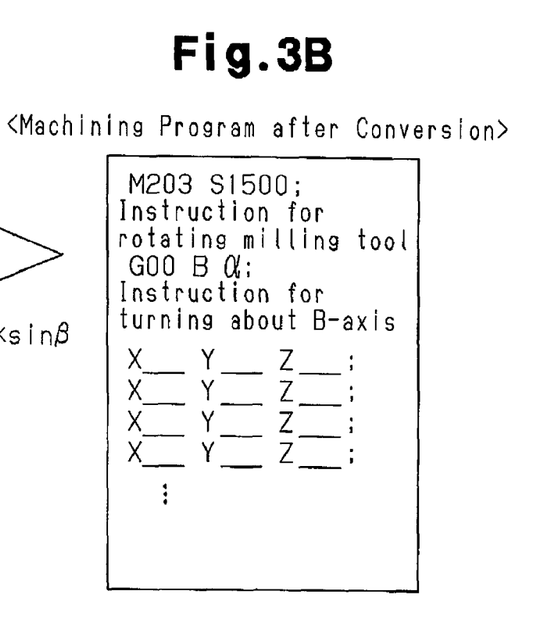
FIG. 3B is an explanatory view showing the NC machining program after being converted.
Figure 3C:
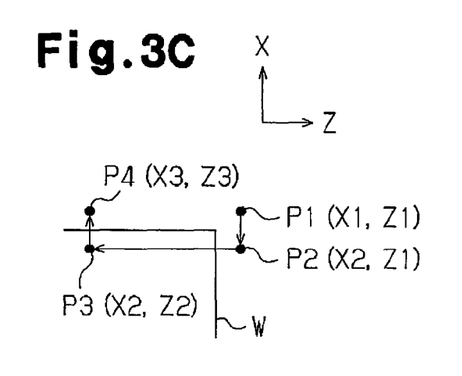
FIG. 3C is an explanatory view showing a position instruction of a two-dimensional workpiece coordinate system.

As mentioned above, the position instruction of the two-dimensional workpiece coordinate system is converted into the position instruction of the three-dimensional workpiece coordinate system on the basis of the data relating to the lead clearance α, the radial clearance β and the dimension of the rotary tool 120, that is, the length L from the B-axis to the distal end of the rotary tool 120, the radius R of the circular tip 140 and the like (refer to FIG. 3B).

In accordance with the present embodiment, it is possible to obtain the following advantages.

With respect to the cutting portion 140a of the rotary tool 120, the NC machining program including the position instruction of the two-dimensional workpiece coordinate system having the Z-axis and the X-axis as the coordinate axes is prepared in the first step. Further, in the second step, the lead clearance α and the radial clearance β are input to the preparing apparatus 200. Further, in the third step, the NC machining program prepared in the first step is converted into the NC machining program including the position instruction of the three-dimensional workpiece coordinate system having the X-axis, the Y-axis and the Z-axis as the coordinate axes, on the basis of the lead clearance α and the radial clearance β.

In accordance with the structure mentioned above, it is possible to easily prepare the NC machining program for cutting the workpiece W while keeping the posture of the rotary tool 120 expressed by the lead clearance α and the radial clearance β.

Further, it is possible to apply a combined force F caused by the cutting load to the axial direction of the rotary tool 120 by setting the lead clearance α. Accordingly, the rotary tool 120 is not bent, and the vibration of the rotary tool 120 is suppressed. Accordingly, the service life of the tool is elongated, and the profile irregularity of the processed surface of the workpiece W is improved. Further, in the case of cutting the workpiece W having a large diameter, it is possible to restrict the protruding amount of the rotary tool 120 from the bite holder 100 to the minimum. Accordingly, it is possible to increase a rigidity of the tool.

Further, the abrasion loss of the flank 142 of the circular tip 140 is reduced, and the service life of the tool is elongated, by setting the radial clearance β. Further, the clearance between the flank 142 of the circular tip 140 and the workpiece W is changed by adjusting the value of the radial clearance β, whereby the abrasion of the flank 142 of the circular tip 140 is further effectively suppressed. Further, since the position in the Y-axis direction of the rotary tool 120 is adjusted in correspondence to the radial clearance β, it is possible to cope with the case that the diameter of the workpiece W is large, and the distance at which the rotary tool 120 is movable in the Y-axis direction is small.

Further, it is possible to prepare the NC machining program including the position instruction of the two-dimensional workpiece coordinate system having the Z-axis and the X-axis as the coordinate axes, with respect to the cutting portion 140a of the rotary tool 120, by the processing section 280 serving as the preparing means. Further, the lead clearance α and the radial clearance β are input to the preparing apparatus 200 by the input operation section 250 serving as the input means. Further, the NC machining program prepared by the processing section 280 is converted into the NC machining program including the position instruction of the three-dimensional workpiece coordinate system having the X-axis, the Y-axis and the Z-axis as the coordinate axes on the basis of the lead clearance α and the radial clearance β, by the processing section 285 serving as the converting means. As a result, it is possible to easily prepare the NC machining program for cutting the workpiece W by the rotary tool such as the circular tip 140 or the like, and it is possible to provide the apparatus for preparing the NC machining program by extension.

The present embodiment may be modified as follows.

In the present embodiment, the bite holder 100 is turned around the B-axis, however, the bite holder 100 may be fixed and the workpiece main shaft 110 may be turned around the B-axis.

In the present embodiment, it is possible to employ a circular truncated cone shaped tip in place of the circular tip 140.

The invention claimed is:

1. A method for preparing an NC machining program used in an NC machining apparatus which includes: a workpiece main shaft to which a workpiece is attached; a bite holder provided so as to be movable along a second axis which is orthogonal to a first axis corresponding to an axis of said workpiece main shaft; said workpiece main shaft or said bite holder being provided so as to be rotatable around a turning axis which is in parallel to a third axis orthogonal to the first axis and the second axis; and the workpiece attached to said workpiece main shaft being cut by a rotary tool provided in said bite holder while said workpiece main shaft is rotated around the first axis; said preparing method comprising:

- a first step of preparing an NC machining program including a position instruction of a cutting portion of said rotary tool at a time of cutting, on the basis of a two-dimensional workpiece coordinate system having the first axis and the second axis as coordinate axes;
- a second step of inputting a first angle around said turning axis with respect to said workpiece main shaft or said bite holder at a time of cutting, and a second angle formed by a line extending between the center line of the workpiece and the point of contact of the rotary tool against the workpiece during the cutting operation and the third axis to said NC machining apparatus; and
- a third step of converting said NC machining program prepared in the first step into an NC machining program including a position instruction of a three-dimensional workpiece coordinate system having the first axis, the second axis and the third axis as the coordinate axes, the third step being done in such a manner that the workpiece can be cut while keeping the posture of the rotary tool expressed by the first angle and the second angle.

2. The method according to claim 1, wherein the position instruction of said two-dimensional workpiece coordinate system is converted into the position instruction of said three-dimensional workpiece coordinate system on the basis of the first angle, the second angle and the dimension of said rotary tool, in the third step.

3. The method according to claim 2, wherein an amount of offset of the position of the cutting portion in the case of keeping the posture of the rotary tool expressed by the first angle and the second angle is computed, and the position instruction of said two-dimensional workpiece coordinate system is converted into the position instruction of said three-dimensional workpiece coordinate system by using the amount of offset to correct the two-dimensional workpiece coordinate system on the basis of the first angle, the second angle and the dimension of said rotary tool.

* * * * *